(12) United States Patent
Zhu et al.

(10) Patent No.: US 8,902,741 B2
(45) Date of Patent: Dec. 2, 2014

(54) USER EQUIPMENT AND METHOD FOR REDUCING DELAY IN A RADIO ACCESS NETWORK

(71) Applicant: Intel Corporation, Santa Clara, CA (US)

(72) Inventors: Jing Zhu, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 13/625,977

(22) Filed: Sep. 25, 2012

(65) Prior Publication Data

US 2013/0242726 A1 Sep. 19, 2013

Related U.S. Application Data

(60) Provisional application No. 61/612,188, filed on Mar. 16, 2012.

(51) Int. Cl.
*H04W 28/02* (2009.01)

(52) U.S. Cl.
USPC ........... 370/229; 370/320; 370/341; 370/412; 370/437

(58) Field of Classification Search
None
See application file for complete search history.

(56) References Cited

U.S. PATENT DOCUMENTS

| | | | |
|---|---|---|---|
| 2007/0259673 A1 | 11/2007 | Willars et al. | |
| 2009/0168708 A1* | 7/2009 | Kumar et al. | 370/329 |
| 2010/0284314 A1 | 11/2010 | Pelletier et al. | |
| 2010/0315948 A1* | 12/2010 | Yi et al. | 370/235 |
| 2011/0044192 A1 | 2/2011 | Wang et al. | |
| 2011/0064034 A1 | 3/2011 | Zhu | |
| 2011/0075744 A1 | 3/2011 | Laselva et al. | |
| 2011/0085566 A1* | 4/2011 | Bucknell et al. | 370/412 |
| 2011/0216717 A1 | 9/2011 | Zhu | |
| 2012/0044880 A1* | 2/2012 | Sun et al. | 370/329 |

FOREIGN PATENT DOCUMENTS

| | | |
|---|---|---|
| KR | 1020100114921 A | 10/2010 |
| KR | 1020100116120 A | 10/2010 |
| WO | WO-2009024596 A1 | 2/2009 |
| WO | WO-2013138043 A1 | 9/2013 |

OTHER PUBLICATIONS

"International Application Serial No. PCT/US2013/027144, International Search Report mailed June 18, 2013", 9 pgs.

"International Application Serial No. PCT/US2013/027144, Written Opinion mailed Jun. 18, 2013", 6 pgs.

* cited by examiner

*Primary Examiner* — Chi Pham
*Assistant Examiner* — Shick Hom
(74) *Attorney, Agent, or Firm* — Schwegman Lundberg & Woessner, P.A.

(57) ABSTRACT

Embodiments of user equipment and methods for reducing delay in a radio-access network (RAN) are generally described herein. Embodiments disclosed herein provide enhancements that may be applicable to a 3GPP LTE RAN for reducing delay that may be particularly beneficial for real-time over-the-top (OTT) applications. Some embodiments provide for an uplink delayed buffer status report. Some embodiments provide for a downlink congestion and buffer report. Some embodiments provide for traffic characteristic based inter-UE prioritization.

15 Claims, 4 Drawing Sheets

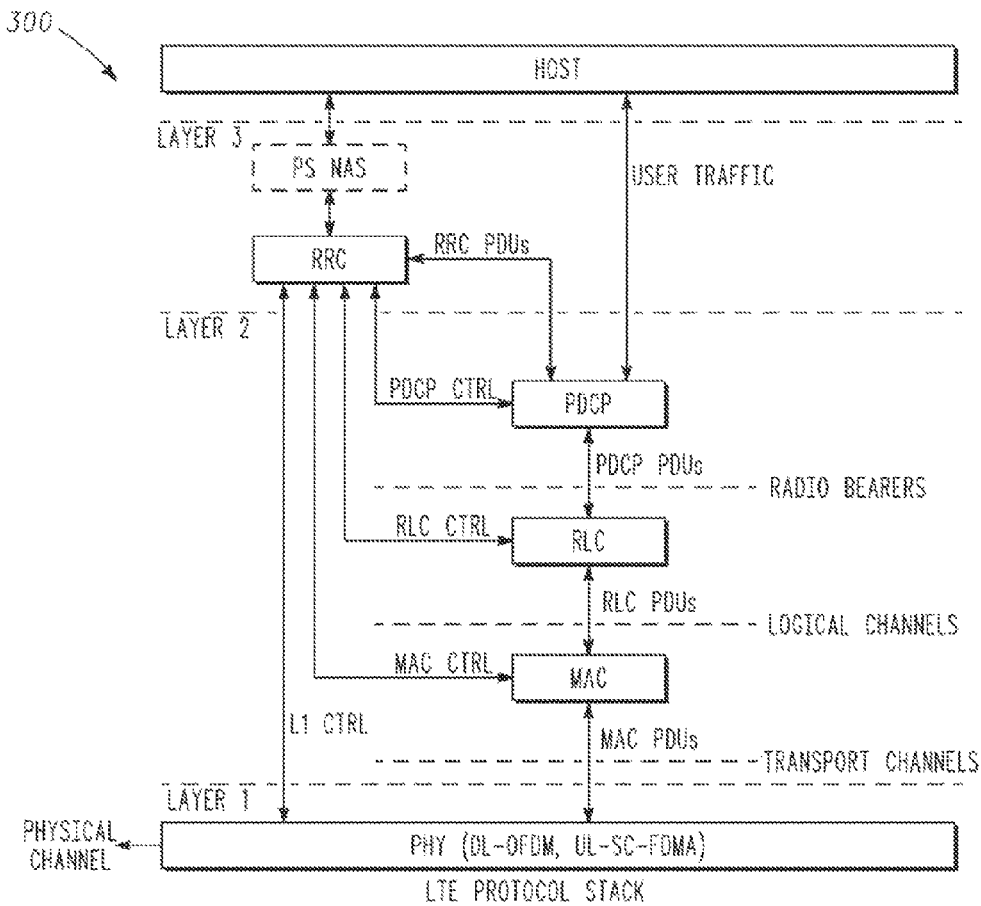

Fig. 5
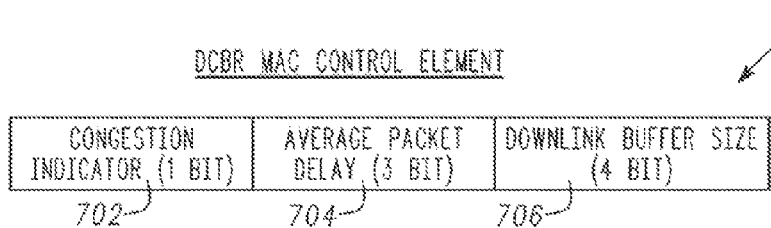
Fig. 6
Fig. 7
Fig. 8A

Fig. 8B
Fig. 9
Fig. 10

USER EQUIPMENT AND METHOD FOR REDUCING DELAY IN A RADIO ACCESS NETWORK

PRIORITY CLAIM

This application claims the benefit of priority under 35 USC 119(e) to U.S. Provisional Patent Application Ser. No. 61/612,188, filed Mar. 16, 2012, which is incorporated herein by reference in its entirety.

TECHNICAL FIELD

Embodiments pertain to wireless communications. Some embodiments relate to packet scheduling in wireless access networks including the third generation partnership project (3GPP) Universal Terrestrial Radio Access Network (UT-RAN) Long-Term-Evolution (LTE) networks (E-UTRAN). Some embodiments relate to the Evolved Packet Core (EPC) of an LTE network.

BACKGROUND

In radio access networks (RANs), communication stations, such as user equipment (LIE), conventionally request grants of uplink bandwidth when uplink packets are ready to send. One issue with this technique is that a UE will have to wait for a new uplink packet to arrive from its application layer before requesting an uplink grant. This results in a delay, which may be an issue particularly for delay-sensitive and real-time applications. With the proliferation of portable internet devices such as smartphones, tablets and notebook devices, packets of various applications are delivered over-the-top (OTT) using a default bearer. These applications are transparent to the EPC making it difficult to support quality-of-service (QoS) level requirements for these applications, particularly for delay-sensitive applications.

Thus, what is needed are UEs and methods that help reduce or eliminate delays in RANs, including delays associated with requesting uplink bandwidth grants. Also needed are UEs and methods that reduce or eliminate delays suitable for use with delay-sensitive and real-time applications. There are general needs for systems and methods that provide improved QoS support for applications and particularly for delay-sensitive applications that are transparent in the EPC.

BRIEF DESCRIPTION OF THE DRAWINGS

FIG. 3 illustrates an LTE protocol stack in accordance with some embodiments;

FIG. 4 is a table illustrating logical channel identifier (LCID) values for an uplink shared channel, in accordance with some embodiments;

FIG. 5 illustrates a delayed buffer status report (D-BSR) medium-access control (MAC) control element in accordance with some embodiments;

FIG. 6 is a table illustrating delay-value indexing in accordance with some embodiments;

FIG. 7 illustrates a downlink congestion and buffer report (DCBR) control element in accordance with some embodiments;

FIG. 8A is a table illustrating average packet delay (APD) indexing in accordance with some embodiments;

FIG. 8B is a table illustrating downlink buffer size (DBS) indexing in accordance with some embodiments;

FIG. 9 is a table illustrating LCID values for a downlink shared channel in accordance with some embodiments; and FIG. 10 is a table illustrating priority to traffic characteristics (TC) parameter mapping (PTM) in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
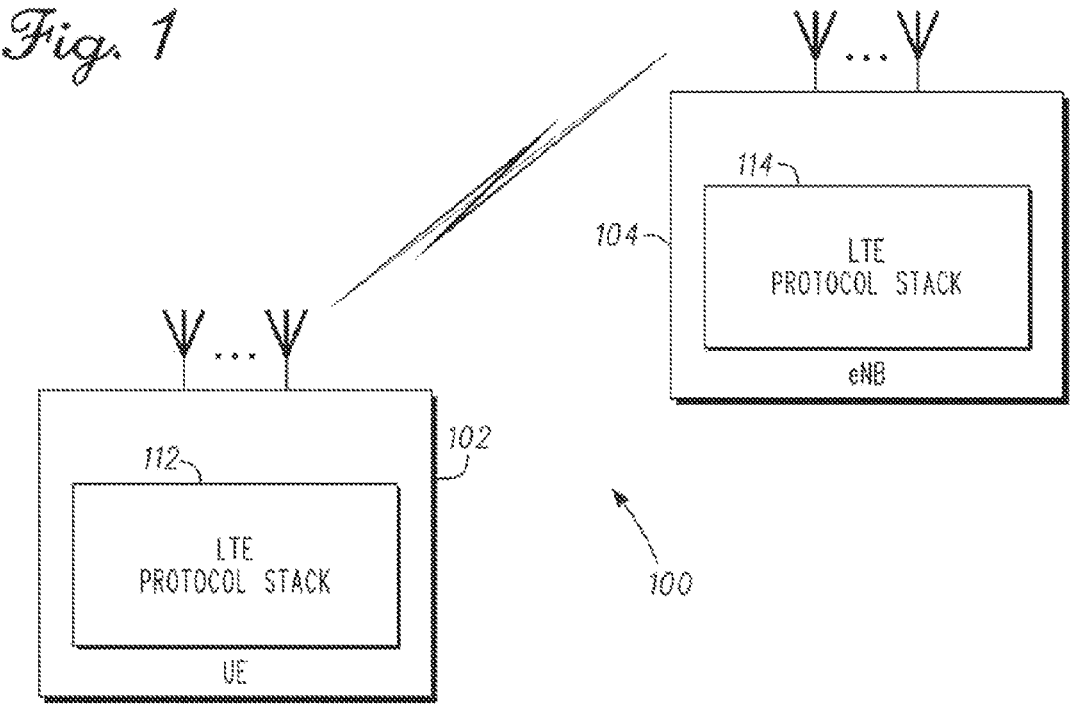
FIG. 1 illustrates elements of a wireless access network in accordance with some embodiments.

FIG. 1 illustrates elements of a wireless access network, in accordance with some embodiments. Radio access network 100 may include user equipment (UE) 102 and enhanced node B (eNB) 104, which communicate wirelessly over one or more wireless communication channels. In radio access network 100, data flows may be mapped to bearers using QoS class identifiers (QCIs). In LTE embodiments, the eNB 104 may include an LTE protocol stack 114 and the UE 102 may include an LTE protocol stack 112. The LTE protocol stacks 112, 114 may be configured to allow the eNB 104 and the UE 102 communicate in accordance with a 3GPP LTE protocol. The LTE protocol stacks may comprise processing circuitry configured to perform the operations described herein.

Some embodiments disclosed herein provide enhancements that may be applicable to a 3GPP LTE radio-access network for reducing delay that may be particularly beneficial for real-time OTT applications. Some embodiments reduce delay by providing for an uplink delayed buffer status report. Some embodiments reduce delay by providing for a downlink congestion and buffer report. Some embodiments reduce delay by providing for traffic characteristic based inter-UE/intra QCI prioritization. These embodiments are described in more detail below.

In accordance with uplink delayed buffer status report embodiments, the UE 102 may determine a delay value indicating a minimum time for the eNB 104 (which may be the serving eNB) to delay scheduling an uplink grant. The UE 102 may determine a predicted buffer size and generate a delayed buffer status report (D-BSR) MAC control element for transmission to the eNB 104 with a last-scheduled uplink (UL) grant (i.e., the prior UL grant). In these embodiments, the D-BSR control element may include at least an indicator of the delay value and an indicator of the predicted buffer size. The predicted buffer size may indicate an amount of grant the UE 102 anticipates it will need at a near-future time indicated by the delay value.

In these embodiments, the D-BSR MAC control element is used to request a delayed uplink grant. The delay value may indicate a minimum time for the eNB 104 to delay scheduling an uplink grant. By predicting a buffer size and requesting the delayed scheduling of an uplink grant, the UE 102 may not have to wait for a new uplink packet to arrive from its application layer before requesting an uplink grant. Conventionally, when the current buffer size is zero, the UE does not request an uplink grant since there are no uplink packets ready for transmission.

In accordance with embodiments, the UE 102 may receive an uplink grant from the eNB 104. In response to the uplink grant, the UE 102 may send a MAC protocol data unit (PDU)

with data pay load and the D-BSR MAC control element to the eNB 104 if no other types of BSRs are triggered. In these embodiments, the delay value and the buffer size in the D-BSR MAC control element may be set by the UE 102 based on information, such as minimum packet size and maximum inter-arrival interval, which may be determined or provided by the applications that are running locally on the UE 102. When the eNB 104 receives the packet with the D-BSR MAC control element, the eNB 104 may schedule an uplink grant with a minimal delay and a grant size based on the information in the D-BSR MAC control element. These embodiments are discussed in more detail below.

In some embodiments, the data flows may be mapped to bearers using the QCIs to provide end-to-end QoS support, via an evolved packet system (EPS) bearer. In some embodiments, the characteristics of QCIs may be in accordance with 3GPP Technical Specification (TS) 23.203, although this is not a requirement. In these embodiments, radio access network 100 may provide an all internet-protocol (IP) core network with open interfaces and may be referred to as an EPC. The EPC may provide higher throughput, lower latency, simplified mobility between 3GPP and non-3GPP networks, enhanced sendee control and provisioning, and efficient use of network resources.

Figure 2:
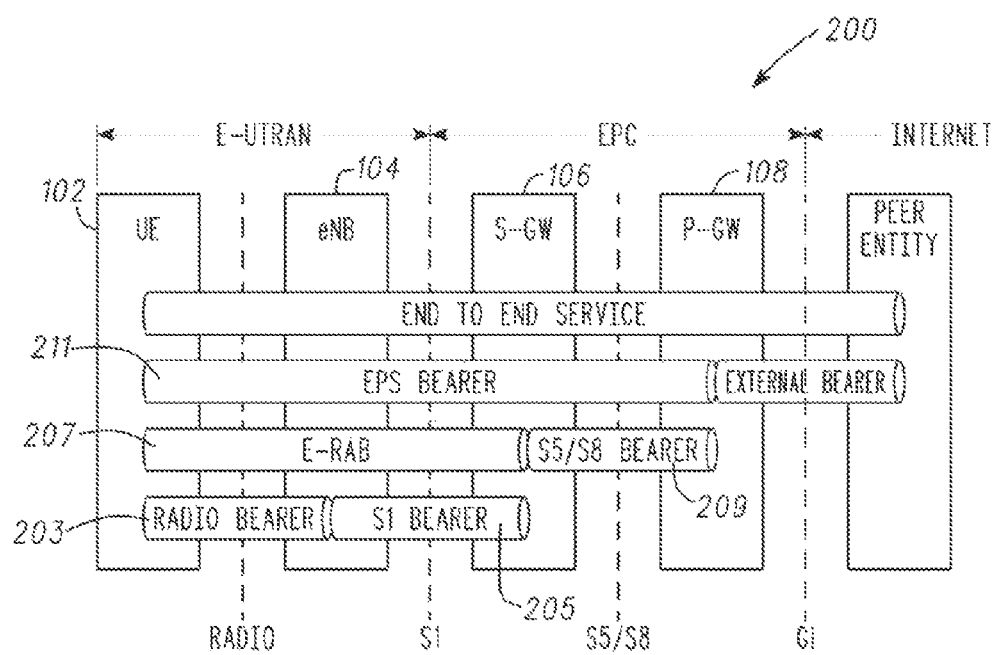
FIG. 2 illustrates various bearers in accordance with some embodiments.

FIG. 2 illustrates various bearers, in accordance with some embodiments. In these embodiments, data flows are mapped to bearers 200 using QCIs. As illustrated in FIG. 2, an E-UTRAN radio-access bearer (E-RAB) 207 may transport the packets of an EPS bearer 211 between the UE 102 and the EPC. When an E-RAB 207 exists, there may be a one-to-one mapping between the E-RAB 207 and the EPS bearer 211. The data radio bearer 203 may transport the packets of an EPS bearer 211 between a UE 102 and an eNB 104. When a data radio bearer exists, there may be a one-to-one mapping between the data radio bearer 203 and the EPS bearer or E-RAB 207. The SI bearer 205 may transport, the packets of an E-RAB 207 between an eNB 104 and a serving gateway (S-GW) 106. An S5/S8 bearer 209 may transport the packets of an EPS bearer 211 between the S-GW 106 and a packet data network (PDN) gateway (P-GW) 108.

The UE 102 may store a mapping between an uplink packet filter and a data radio bearer to create the binding between a data flow and a data radio bearer in the uplink. An uplink traffic-flow template (TFT) in the UE may bind a data flow to an EPS bearer in the uplink direction. Multiple data flows may be multiplexed onto the same EPS bearer. A downlink TFT in the P-GW may bind a data flow to an EPS bearer in the downlink direction. Multiple data flows can be multiplexed onto the same EPS bearer by including multiple downlink packet filters in the downlink TFT. The P-GW 108 may store a mapping between a downlink packet filter and an S5/S8 bearer 209 to create the binding between a data flow and an S5/S8 a bearer in the downlink.

The eNB 104 may store a one-to-one mapping between the data radio bearer 203 and the S1 bearer 205 to create the binding between a data radio bearer and an S1 bearer in both the uplink and downlink. The S-GW 106 may store a one-to-one mapping between the S1 bearer 205 and the S5/S8 bearer 209 to create the binding between an S1 bearer and an S5/S8 bearer in both the uplink and downlink.

In some embodiments, packets of the data flows are delivered OTT using the default bearer (i.e., QCI=9). Examples of such applications include applications that may be running on a portable internet device such as a smartphone, tablet or ultrabook for use over the network. Data packets generated by these applications may be delivered OTT (i.e., using the default bearer) since the QoS requirements may not be known to the network or the mobile operators (e.g., sometimes due to encryption). Examples of some delay-sensitive and real-time applications that may delivered OTT may include Skype, FaceTime, GoogleTalk and voice-over-internet protocol (VoIP), each having different QoS requirements in terms of delay and throughput, which may be distinguished from non-real-time applications such as web browsing or email. The use of a D-BSR may reduce any delay associated with real-time applications that are delivered OTT.

FIG. 3 illustrates an LTE protocol stack in accordance with some embodiments. LTE protocol stack 300 may be suitable for use as LTE protocol stack 112 (FIG. 1) and LTE protocol stack 114 (FIG. 1), although other configurations may also be suitable.

LTE channels may be categorized into three types of data channels. A logical channel is defined by the type of information it carries. The logical channel is classified into control and traffic channels. The transport channel is defined by how and with what characteristics the information is transmitted. The physical channel is defined by the physical resources used to transmit the data. Transport channels are mapped onto physical channels. Data channels are further divided into control channels and traffic channels. The traffic channels carry information of the user-plane, while the control channels carry information of the control-plane. The radio bearer channel transports the packets of the EPS bearer between the UE 102 and the eNB 104.

LTE Layer 3 includes the Radio Resource Control (RRC) layer. The LTE RRC layer provides broadcast of system information, configures the MAC, Radio Link Control (RLC) and Packet Data Convergence Protocol (PDCP) layers, and carries out mobility functions and QoS management functions. Further, the RRC is responsible for control plane signaling between UE and the network. The RRC takes care of the broadcasted system information related to the access stratum and transport of the Non-Access Stratum (NAS) messages, paging, establishment and release of the RRC connection, security key management, handover, UE measurements related to inter-system mobility, QoS, and the like. The NAS provides communication between the UE and the mobility management entity (MME) on the network side (not shown) for control purposes, such as network attach, authentication, establishing and setting up bearers, and mobility management. The NAS also performs authentication of the UE and security control and generates part of the paging messages Layer 3 interfaces with layer 2 and also directly interfaces with layer 1. Layer 2 is split into the MAC, RLC and PDCP. The MAC provides addressing and channel access control mechanisms. The MAC also manages hybrid automatic repeat request (HARQ) error correction, prioritization of the logical channels for the same UE and dynamic scheduling between UEs, and the like. The RLC is used to format and transport traffic. Further, the RLC transports the PDUs of the PDCP and may work in one of three different modes depending on the reliability provided. Depending on this mode, the RLC can provide automatic repeat request (ARQ) error correction, segmentation/concatenation of PDUs, reordering for in-sequence delivery, duplicate detection, and the like. The PDCP is responsible for (de-) compressing the headers of IP packets of the user plane. The PDCP provides transport of data of the RRC with ciphering and integrity protection and for the IP layer transport of the IP packets, with header compression, ciphering, and, depending on the mode of the RRC, in-sequence delivery, duplicate detection, and retransmission of its own sendee data units (SDUs) during handover, Layer 1 is the physical (PHY) layer and provides the basic networking hardware transmission technologies of a network. The PHY layer translates logical communication requests into hardware specific operations such as modulation, bit synchronization, multiplexing, equalization, forward error correction and the like. The physical layer carries information from the transport channels of the MAC over the air interface, and handles the link adaptation (AMC), power control, cell search (for initial synchronization and handover purposes), and other measurements (inside the LTE system and between systems) for the RRC layer.

FIG. 4 is a table illustrating LCID values for an uplink shared channel in accordance with some embodiments. In these embodiments, the UE 102 (FIG. 1) may configure the D-BSR MAC control element to further include a LCID index 402 to indicate a control element for a delayed buffer status report. In other words, the LCID index 402 may indicate that the MAC control element is a D-BSR MAC control element. In these embodiments, a predetermined LCID index 404, such as index '01011' as illustrated in FIG. 4, may be used to indicate that the D-BSR MAC control element includes information for a D-BSR and is a D-BSR control element (rather than another type of MAC control element as illustrated in the table). A non-delayed or conventional BSR control element may include an LCID index to indicate one of a truncated BSR 406, a short BSR 408 and a long BSR 410.

FIG. 5 illustrates a D-BSR MAC control element in accordance with some embodiments. In these embodiments, the D-BSR MAC control element 500 may include a logical channel group (LCG) identifier (ID) field 502 to indicate the LCG ID of the control element 500. The LCG ID field 502 may include a predetermined LCID index 404 (FIG. 4), such as index '01011' as illustrated in FIG. 4, to indicate that the control element is a D-BSR MAC control element that is requesting a delayed uplink grant. The D-BSR. MAC control element 500 may also include at least an indicator 504 of the delay value and an indicator 506 of the predicted buffer size.

In some embodiments, the D-BSR MAC control element 500 may be considered a MAC control frame. The D-BSR MAC control element 500 may be a request for a delayed grant of uplink bandwidth. In some embodiments, the D-BSR MAC control element 500 may be sent from the UE 102 to the eNB 104 on an uplink shared channel (UL-SCH), although the scope of the embodiments is not limited in this respect.

FIG. 6 is a table illustrating delay-value indexing in accordance with some embodiments. An index 602 for a selected delay value 604 may be included in the D-BSR MAC control element 500 (FIG. 5) for indicator 504 (FIG. 5). The table may be stored in memory of the UE 102 (FIG. 1).

In accordance with embodiments, the UE 102 may determine the delay value 604 indicating a time for the eNB 104 to delay scheduling an uplink grant. The UE 102 may also determine the predicted buffer size for indication by indicator 504, and may generate the D-BSR MAC control element 500 for transmission to the eNB 104 with the last-scheduled uplink grant. As discussed above, the D-BSR MAC control element 500 may include at least an indicator 504 of the delay value 604 and the indicator 506 of the predicted buffer size.

In some embodiments, the delay value 604 may indicate a minimum time for the eNB 104 to delay scheduling an uplink grant. In some embodiments, the predicted buffer size indicates an amount of uplink grant the UE 102 anticipates it will need at a near-future time indicated by the delay value 604.

In some embodiments, the UE 102 may be configured to refrain from requesting an additional uplink grant in response to receipt of a new uplink packet from an application layer when expecting a delayed grant (in response to transmitting the D-BSR MAC control element 500). These embodiments are described in more detail below.

In some embodiments, the UE 102 may receive a delayed grant for uplink bandwidth in response to transmission of the D-BSR MAC control element 500. The grant may be received from the eNB 104 no sooner than the delay value 604 and include a bandwidth allocation sufficient to handle the predicted buffer size 506.

In some embodiments, the UE 102 may generate the D-BSR MAC control element 500 for transmission to the eNB 104 with the last-scheduled uplink grant when a current buffer size is zero and when the UE anticipates (e.g., predicts or determines) that it will have uplink packets soon (e.g., within less than 120 ms) based on the predicted buffer size (i.e., since the predicted buffer size is greater than zero). In these embodiments, the buffer-status report may indicate that current uplink buffer is empty and therefore the UE 102 does not have any packets ready for uplink transmission; however, the D-BSR MAC control element 500 is configured to indicate the predicted buffer size. In these embodiments, the D-BSR MAC control element 500 may be used only used when the current buffer size is zero. Otherwise a conventional or non-delayed BSR control element may be used. In these embodiments, the predicted buffer size may be determined based on applications that may be running on the UE that are generating packets for uplink transmission.

In some embodiments, the UE 102 may refrain from generating the D-BSR MAC control element 500 for transmission to the eNB 104 with the last-scheduled grant when the current buffer size is zero and when the UE does not anticipate that it will have packets soon based on the predicted buffer size. In this situation, the predicted buffer size may be zero; however, the current buffer size may be zero or greater than zero.

In some embodiments, the UE 102 may generate a non-delayed BSR control element for transmission to the eNB 104 with the last-scheduled uplink grant when the current buffer size is not zero. The non-delayed BSR control element may indicate at least the current buffer size. The non-delayed BSR control element may be a conventional BSR control element, although the scope of the embodiments is not limited in this respect. The non-delayed BSR control element may include an LCID index to indicate one of a truncated BSR 406, a short BSR 408 and a long BSR 410 as illustrated in FIG, 4.

In some embodiments, the UE 102 may refrain from generating the D-BSR MAC control frame 500 when other types of BSRs are triggered. In these embodiments, the UE 102 may generate the D-BSR MAC control frame 500 when none of the other types of (non-delayed) BSRs are triggered. The non-delayed BSRs may be triggered when the current buffer size at the LIE is not zero. The embodiments disclosed herein for D-BSR reporting are unlike some conventional BSR. reporting in which no grant is requested or scheduled when the current buffer size is zero, thereby causing the UE 102 to wait for a future (new) uplink packet to arrive from the application layer of the UE 102 before requesting an uplink grant. The use of a D-BSR MAC control element 500 may reduce the delay between when a new packet arrives from the application layer and when the eNB 104 schedules an uplink grant. Through the use of a D-BSR MAC control element 500, this delay may be reduced to zero or close to zero.

Conventionally, an eNB 104 has to wait for this delay (at a minimum) before scheduling grants based on the reported buffer size. However in accordance with an example embodiment, at $t_0$, the UE 102 may send a D-BSR MAC control element to the eNB 104 with the delay set to 100 ms and the buffer size set to 100 Bytes. Then, the eNB 104 may schedule the 100 bytes only after $t_0+100$ ms. In some embodiments, the delay value 504 indicates the minimum amount of time that the eNB 104 is to wait before scheduling an uplink grant. In this example, the eNB 104 may schedule the grant at $t_0+200$ ms (any value greater than or equal to 100 ms), but would not schedule a grant at $t_0+99$ ms.

In some embodiments, the UE 102 may be configured to determine the delay value 604 and the predicted buffer size (i.e., for inclusion in the D-BSR MAC control element 500) based at least in part on uplink traffic information for one or more applications running on the UE 102. The uplink traffic information includes one or more of a packet or bit generation rate, a packet arrival interval (PAI) and packet size (PS) information for the one or more applications. In these embodiments, the UE 102 may determine the delay value and the predicted buffer size based on information, such as minimum PS and maximum inter-arrival interval, which may be determined or provided by the applications that are running locally on the UE 102.

In some embodiments, the delay value 604 may be determined based on the packet arrival interval, the last packet arrival time, and the last grant arrival time. The predicted buffer size may be based on the packet size. In these embodiments, the delay value 604 may be an uplink grant request delay value.

In an example embodiment in which a VoIP application is running on the UE 102 and generating traffic at a constant bit rate (CBR) with a PAI of 20 ms and a PS of 200 bites, the UE 102 may determine the delay value 604 and the predicted buffer size as follows: The delay value may be calculated based on the equation $z-(y-x)$, and the predicted buffer size may be set to 's', where 'x' represents the last packet arrival time (packet arriving from upper layer to cellular modem), 'y' represents the last grant arrival time (the grant is used to schedule D-BSR and the last packet in the buffer), 'z' represents the known PAI, and 's' represents the known PS. A delay value 604 may be selected from a table, such as the table illustrated in FIG. 6, which may be stored in the memory of the UE 102. In these embodiments, the delay value selected from the table may be greater than or equal to the calculated delay value. For example, if a delay value of 21 ms is calculated, the delay value of 40 ms may be selected from the table. The index 602 for the selected delay value may be included in the D-BSR MAC control element 500 for indicator 504.

In some embodiments, the D-BSR MAC control element 500 may be used for requesting a delayed grant of uplink bandwidth for one or more data flows. For example, the UE 102 may be configured to operate within a radio access network (such as an LTE network) in which the data flows are mapped to bearers using QCIs. The data flows may be associated with OTT applications using a default bearer (e.g., QCI=9), although the scope of the embodiments is not limited in this respect as the D-BSR MAC control element 500 may be used to request delay grants of uplink bandwidth for data flows with other QCI values. In these embodiments, each bandwidth request may be associated with a LCG, which may be identified in the LCG ID field 502 of the D-BSR MAC control element 500. In some embodiments, all data traffic for the UE regardless of the QCI may be sent in the same LCG.

In some downlink congestion and buffer report embodiments, the UE 102 may be configured to send a request to the eNB 104 to activate downlink congestion and buffer reporting and to receive a DCBR from the eNB 104. The DCBR may indicate whether or not congestion exists for downlink traffic and may indicate average packet delay and downlink buffer size. The DCBR may indicate whether or not congestion exists for downlink traffic for a certain QCI of the EPS bearer. In response to receipt of a DCBR that indicates that congestion exists, the LIE 102 may report information from the DCBR to one or more of its applications (operating at upper-level layers) for traffic rate reduction, congestion mitigation and/or delay reduction. These embodiments are discussed in more detail below.

FIG. 7 illustrates a DCBR control element in accordance with some embodiments. The DCBR may be received by the UE 102 (FIG. 1) as part of a DCBR MAC control element 700, which may include a congestion indicator (CI) 702, an average packet delay (APD) indicator 704 and a DBS indicator 706. The CI 702 may indicate whether or not congestion exists for downlink traffic.

In some embodiments, the DCBR MAC control element 700 may include a LCID index 904 (FIG. 9) to indicate that the control element is for downlink congestion and buffer reporting. In some embodiments, the DCBR MAC1 control element 700 may include a LCG ID field (not separately illustrated), which may be similar to field 502 (FIG. 5).

In some embodiments, the DCBR MAC control element 700 may be received by the UE 102 from the eNB 104 on downlink shared channel (DL-SCH) as part of a MAC PDU or along with a MAC PDU, although the scope of the embodiments is not limited in this respect. In these embodiments, the APD indicator 704 indicates an average packet delay on the downlink and the DBS indicator 706 indicates a number of remaining bytes in a downlink buffer.

In some embodiments, congestion may be detected by the eNB 104 based on its downlink transmission queue, for example, although the scope of the embodiments is not limited in this respect. In some embodiments, congestion may be detected if the queuing delay of the downlink transmission queue exceeds a threshold (e.g., 200 ms) continuously for a period of time longer than a threshold (e.g., 20 ms), although the scope of the embodiments is not limited in this respect.

In an example embodiment, the average packet delay may be measured every N transmitted packets (e.g., N=100), and the buffer size may indicate the number of remaining bytes when the DCBR MAC control element 700 is prepared. The tables of FIGS. 8A and 8B are examples of how the APD 804 and DBS 806 may be encoded for inclusion in the DCBR MAC control element 700. In an example embodiment, the CI indicator 702 may be set to zero to indicate that congestion does not exist or no longer exists and may be set to another value to indicate that congestion, is detected.

In some embodiments, the eNB 104 may receive an RRC message to activate downlink congestion and buffer reporting from the UE 102. The message may indicate the QCI of the EPS bearer where downlink congestion and buffer reporting is to be activated. The eNB 104 may monitor downlink traffic of the indicated QCI for the UE 102 to determine whether congestion exists and may send DCBR MAC control element 700 to the UE 102 along with a MAC PDU. The QCI may indicate a default bearer (e.g., QCI=9), although this is not a requirement as other QCIs may be indicated. The DCBR MAC control element 700 may indicate whether or not congestion exists for downlink traffic for the identified QCI of the EPS bearer, may indicate the APD, and may indicate the downlink buffer size. In response to receipt of a DCBR MAC control element 700 that, indicates that congestion exists, the UE 102 may report information from the DCBR MAC control element 700 to one or more of its applications (operating at upper-level layers) for traffic rate reduction, congestion mitigation, and/or delay reduction.

In some embodiments, the eNB 104 may be configured to continue to send a DCBR MAC control element 700 to the UE 102 with MAC PDUs when the downlink buffer size increases for downlink traffic with the indicated QCI. The eNB 104 may send MAC PDUs without a DCBR MAC control element 700 when the downlink buffer size does not increase for downlink traffic with the indicated QCI.

When downlink congestion is no longer detected, the eNB 104 may send a DCBR. MAC control element 700 to the UE 102 with a MAC PDU indicating that congestion no longer exists (i.e., the CI may be set to zero). In this case, the DCBR MAC control element 700 may include the current average packet delay and the current downlink buffer size. In these embodiments, the UE 102 may be configured to send a RRC message to deactivate downlink congestion and buffer reporting. The message to deactivate downlink congestion and buffer reporting may be sent from the UE 102 at any time after downlink congestion and buffer reporting has been activated and the UE 102 no longer wishes to receive downlink congestion and buffer reports from the eNB 104. In response to receipt of the RRC message to deactivate downlink congestion and buffer reporting, the eNB 104 may deactivate downlink congestion and buffer reporting and may refrain from sending any further DCBR MAC control frames.

FIG. 9 is a table illustrating LCID values for a downlink shared channel in accordance with some embodiments. In these embodiments, the DCBR MAC control element 700 (FIG. 7) may include a LCID index 904, such as index '01011', to indicate that the control element is for downlink congestion and buffer reporting.

FIG. 10 is a table illustrating priority to PTM in accordance with some embodiments. In these PTM embodiments, the UE 102 (FIG. 1) and the eNB 104 (FIG. 1) may be arranged to perform traffic characteristic (TC) based inter-UE/intra-QCI prioritization (TCUP). In these embodiments, the eNB 104 may send inter-UE/intra-QCI traffic characteristics to the UE 102 to allow the UE 102 to inform its applications to regulate their traffic. The eNB 104 may, for example, prioritize light real-time traffic over heavy non-real-time traffic even when both traffic types have the same QCI. Examples of traffic characteristics may include maximum traffic burst size, and maximum sustained traffic rate, although other traffic characteristics may also be used.

In some embodiments, the UE 102 may send an RRC request message to the eNB 104 to activate TCI P for QCI of an EPS bearer. The UE 102 may receive an RRC response message from the eNB 104 indicating a priority to traffic-characteristic parameter mapping (e.g., PTM) for the requested QCI, The RRC response may indicate inter-UE/intra-QCI priority and TC parameters. The UE 102 may regulate uplink traffic having the requested QCI based on the PTM, In these embodiments, the RRC request message sent by the UE 102 may indicate the QCI of the EPS bearer where TCUP will be active. In these embodiments, the RRC response message may be sent from the eNB 104 if the eNB 104 accepts the request for TCUP.

In some embodiments, the inter-UE/intra-QCI priority and TC parameters may include an inter-UE/intra-QCI priority 1002 for one or more of a maximum traffic burst size 1004 and maximum sustained traffic rate 1006. An example of this is illustrated in FIG. 10. In these embodiments, the regulating of the uplink traffic may include instructing one or more applications operating on the UE 102 to regulate uplink traffic based on the parameters.

In the example illustrated in FIG. 10, traffic for a UE with a QCI of 9 will be given higher priority in the scheduling if its maximum traffic burst is <200 bytes, and its maximum sustained traffic rate is <10 kBps. In some embodiments, the PTM may be UE specific, which may depend on the UE's channel quality and mobility characteristics. The details on how to specify the PTM may be up to individual eNB implementation, In some embodiments, the eNB 104 may send a RRC message to the UE 102 if the mapping needs to be updated due to a change in network load, a change in UE channel quality, or other reason. The UE 102 may also send an RRC message to deactivate TCUP.

In some embodiments, the physical layer of the UE 102 (see FIG. 3) may include physical layer circuitry for transmitting and receiving signals to and from eNBs using one or more antennas. The UE 102 may also include processing circuitry that may include, among other things, a channel estimator. The UE 102 may also include memory. The processing circuitry may be configured to determine several different feedback values discussed below for transmission to the eNB. The processing circuitry may also include a MAC layer.

In some embodiments, the UE 102 may include one or more of a keyboard, a display, a non-volatile memory port, multiple antennas, a graphics processor, an application processor, speakers, and other mobile device elements. The display may be a liquid-crystal display (LCD) screen including a touch screen. The one or more antennas utilized by the UE 102 may comprise one or more directional or omnidirectional antennas, including, for example, dipole antennas, monopole antennas, patch antennas, loop antennas, microstrip antennas or other types of antennas suitable for transmission of radio-frequency (RF) signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 102 may be configured with the instructions to perform the operations described herein.

In some embodiments, the UE 102 may be configured to receive orthogonal frequency division multiplexed (OFDM) communication signals over a multicarrier communication channel in accordance with an orthogonal frequency division multiple access (OFDMA) communication technique. The OFDM signals may comprise a plurality of orthogonal sub-carriers.

In some LTE embodiments, the basic unit of the wireless resource is the Physical Resource Block (PRB), The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 102 and the eNB 104 may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 102 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 102 may calculate several different feedback values, which may be used to perform channel adaption for closed-loop spatial multiplexing transmission mode. These feedback values may include a channel-quality indicator (CQI), a rank indicator (RI) and a preceding matrix indicator (PMI). By the CQI, the transmitter selects one of several modulation alphabets and code rate combinations. The RI informs the transmitter about the number of useful transmission layers for the current MIMO channel, and the PMI indicates the codebook index of the preceding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 102. The CQI allows the UE 102 to propose to an eNB an optimum modulation scheme and coding rate to use for a given radio link quality so that the resulting transport block error rate would not exceed a certain value, such as 10%. In some embodiments, the UE may report a wideband CQI value, which refers to the channel quality of the system bandwidth. The UE may also report a sub-band CQI value per sub-band of a certain number of resource blocks, which may be configured by higher layers. The full set of sub-bands may cover the system bandwidth. In case of spatial multiplexing, a CQI per code word may be reported.

In some embodiments, the PMI may indicate an optimum preceding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO, and closed-loop rank 1 preceding MIMO modes.

In some cooperating multipoint (CoMP) embodiments, the network may be configured for joint transmissions to a UE in which two or more cooperating/coordinating points, such as remote-radio heads (RRHs), transmit jointly. In these embodiments, the joint transmissions may be MIMO transmissions, and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising processing circuitry to:
    determine a delay value indicating a time for an enhanced Node B (eNB) to delay scheduling an uplink grant; and
    generate a delayed buffer status report (D-BSR) medium-access control (MAC) control element for transmission to the eNB with a last-scheduled uplink grant, the D-BSR MAC control element to include at least an indicator of the delay value and an indicator of a predicted buffer size,
    wherein the D-BSR MAC control element is a request for a delayed grant of uplink bandwidth,
    wherein the processing circuitry further configures the D-BSR MAC control element to further include a logical channel identifier (LCID) index to indicate a control element for the delayed buffer status report, and
    wherein the UE is configured to receive a delayed grant for uplink bandwidth in response to transmission of the D-BSR MAC control element, the grant being received from the eNB no sooner than the delay value and including a bandwidth allocation sufficient to handle the predicted buffer size.

2. The UE of claim 1, wherein the predicted buffer size indicates an amount of uplink grant the UE anticipates it will need at a near-future time indicated by the delay value, and
    wherein the UE is configured to refrain from requesting the uplink grant in response to receipt of a new uplink packet from an application layer when expecting the delayed grant.

3. The UE of claim 1, wherein the LIE is to generate the D-BSR MAC control element for transmission to the eNB with the last-scheduled uplink grant when a current buffer size is zero and when the UE anticipates that it will have uplink packets based on the predicted buffer size.

4. The UE of claim 3, wherein the UE is to refrain from generating the D-BSR MAC control element for transmission to the eNB with the last-scheduled grant when the current buffer size is zero and when the UE does not anticipate that it will have packets based on the predicted buffer size.

5. The UE of claim 3 wherein the UE is to generate a non-delayed BSR control element for transmission to the eNB with the last-scheduled uplink grant when the current buffer size is not zero, the non-delayed BSR control element indicating at least the current buffer size,
 wherein the non-delayed BSR control element includes a LCID index to indicate one of a truncated BSR, a short BSR and a long BSR.

6. User Equipment (UE) comprising processing circuitry to:
 determine a delay value indicating a time for an enhanced Node B (eNB) to delay scheduling an uplink grant:
 generate a delayed buffer status report (D-BSR) medium-access control (MAC) control element for transmission to the eNB with a last-scheduled uplink grant, the D-BSR MAC control element to include at least an indicator of the delay value and an indicator of a predicted buffer size; and
 determine the delay value and the predicted buffer size based at least in part on uplink traffic information for one or more applications running on the UE,
 wherein the D-BSR MAC control element is a request for a delayed grant of uplink bandwidth, and
 wherein the uplink traffic information includes one or more of a packet or bit generation rate, a packet arrival interval (PAI) and packet size (PS) information for the one or more applications.

7. User Equipment (UE) comprising processing circuitry to:
 determine a delay value indicating a time for an enhanced Node B (eNB) to delay scheduling an uplink grant; and
 generate a delayed buffer status report (D-BSR) medium-access control (MAC) control element for transmission to the eNB with a last-scheduled uplink grant, the D-BSR MAC control element to include at least an indicator of the delay value and an indicator of a predicted buffer size,
 wherein the D-BSR MAC control element is a request for a delayed grant of uplink bandwidth,
 wherein the D-BSR MAC control element is requesting a delayed grant of uplink bandwidth for data flows, and
 wherein the UE is configured to operate within a wireless access network in which the data flows are mapped to bearers using quality-of-service (QoS) class identifiers (QCIs).

8. User Equipment (UE) comprising processing circuitry to:
 determine a delay value indicating a time for an enhanced Node B (eNB) to delay scheduling an uplink grant; and
 generate a delayed buffer status report (D-BSR) medium-access control (MAC) control element for transmission to the eNB with a last-scheduled uplink grant, the D-BSR MAC control element to include at least an indicator of the delay value and an indicator of a predicted buffer size,
 wherein the D-BSR MAC control element is a request for a delayed grant of uplink bandwidth,
 wherein the UE is configured to receive a downlink congestion and buffer report (DCBR) from the eNB indicating whether or not congestion exists for downlink traffic, indicating average packet delay (APD), and indicating a downlink buffer size, and
 wherein in response to receipt of the DCBR that indicates that congestion exists, the UE is to report information from the DCBR to one or more applications for one or more of traffic rate reduction, congestion mitigation and delay reduction.

9. The UE of claim 8 wherein the DCBR is received as part of a DCBR MAC control element, the DCBR including a congestion indicator (CI), an average packet delay (APD) indicator, and a downlink buffer size (DBS) indicator, the CI indicating whether or not congestion exists for downlink traffic, and
 wherein the DCBR MAC control element includes a logical channel identifier (LCID) index to indicate a DCBR.

10. A method for reducing delay in a radio-access network, the method comprising:
 determining a delay value indicating a time for an enhanced Node B (eNB) to delay scheduling an uplink grant;
 generating a delayed buffer status report (D-BSR) medium-access control (MAC) control element for transmission to the eNB with a last-scheduled uplink grant, the D-BSR MAC control element to include at least an indicator of the delay value and an indicator of a predicted buffer size; and
 receiving a delayed grant for uplink bandwidth in response to transmission of the D-BSR MAC control element, the delayed grant being received from the eNB no sooner than the delay value,
 wherein the delayed grant includes a bandwidth allocation sufficient to handle the predicted buffer size.

11. The method of claim 10 further comprising:
 determining the predicted buffer size; and
 configuring the D-BSR MAC control element to include a logical channel identifier (LCID) index to indicate a control element for a delayed buffer status report.

12. A method for reducing delay in a radio-access network, the method comprising:
 determining a delay value indicating a time for an enhanced Node B (eNB) to delay scheduling an uplink grant;
 generating a delayed buffer status report (D-BSR) medium-access control (MAC) control element for transmission to the eNB with a last-scheduled uplink grant, the D-BSR MAC control element to include at least an indicator of the delay value and an indicator of a predicted buffer size;and
 receiving delayed grant for uplink bandwidth in response to transmission of the D-BSR MAC control element the delayed grant being received from the eNB no sooner than the delay value,
 wherein the predicted buffer size indicates an amount of uplink grant the UE anticipates it will need at a near-future time indicated by the delay value, and
 wherein the method includes refraining from requesting an uplink grant in response to receipt of a new uplink packet from an application layer when expecting a delayed grant.

13. A method for reducing delay in a radio-access network, the method comprising:
 determining a delay value indicating a time for an enhanced Node B (eNB) to delay scheduling an uplink grant;
 generating a delayed buffer status report (D-BSR) medium-access control (MAC) control element for transmission to the eNB with a last-scheduled uplink grant, the D-BSR MAC control element to include at least an indicator of the delay value and an indicator of a predicted buffer size; and
 receiving a delayed grant for uplink bandwidth in response to transmission of the D-BSR MAC control element, the delayed grant being received from the eNB no sooner than the delay value, wherein the UE is to generate the D-BSR MAC control element for transmission to the eNB with the last-scheduled uplink grant when a current buffer size is zero and when the UE anticipates that it will have uplink packets based on the predicted buffer size.

14. An enhanced Node B (eNB) comprising processing circuitry configured to:

receive an radio-resource control (RRC) message to activate downlink congestion and buffer reporting from user equipment (UE), the message indicating a quality-of-service (QoS) class identifier (QCI) of a bearer where the downlink congestion and buffer reporting is to be activated;

monitor downlink traffic of the indicated QCI to determine whether congestion exists; and send a downlink congestion and buffer report (DCBR) to the UE along with a medium-access control (MAC) protocol data unit (PDU) (MAC PDU), the DCBR indicating whether or not congestion exists for downlink traffic of the identified QCI, indicating average packet delay, and indicating a downlink buffer size, wherein in response to receipt of a DCBR that indicates that congestion exists, the UE is to report information from the DCBR to one or more applications for one or more of traffic rate reduction, congestion mitigation and delay reduction, wherein the QCI indicates a default bearer, and wherein the eNB is further configured to:

continue to send a DCBR to the UE with MAC PDUs when the downlink buffer size increases for downlink traffic with the indicated QCI;

send MAC PDUs without a DCBR while the downlink buffer size does not increase for downlink traffic with the indicated QCI; and when downlink congestion is no longer detected, send a DCBR to the UE with a MAC PDU indicating that congestion no longer exists and including a current average packet delay and a downlink buffer size.

15. The eNB of claim 14 wherein the DCBR is included as part of a DCBR MAC control element that includes a congestion indicator, an average packet delay indicator, and a downlink buffer size (DBS) indicator, the congestion indicator indicating whether or not congestion exists for downlink traffic, and wherein the DCBR MAC control element includes a logical channel identifier (LCID) index to indicate downlink congestion and buffer reporting.

* * * * *

UNITED STATES PATENT AND TRADEMARK OFFICE
CERTIFICATE OF CORRECTION

| | | |
|---|---|---|
| PATENT NO. | : 8,902,741 B2 | Page 1 of 1 |
| APPLICATION NO. | : 13/625977 | |
| DATED | : December 2, 2014 | |
| INVENTOR(S) | : Zhu et al. | |

It is certified that error appears in the above-identified patent and that said Letters Patent is hereby corrected as shown below:

In the Claims,

In column 12, line 58, in Claim 3, delete "LIE" and insert --UE--, therefor

In column 13, line 12, in Claim 6, delete "grant:" and insert --grant;--, therefor In column 14, line 41, in Claim 12, delete "size;and" and insert --size; and--, therefor In column 14, line 42, in Claim 12, after "receiving", insert --a--, therefor In column 14, line 43, in Claim 12, after "element", insert --,--, therefor Signed and Sealed this
Fourth Day of August, 2015

Michelle K. Lee
*Director of the United States Patent and Trademark Office*